(12) United States Patent
Xiang et al.

(10) Patent No.: US 10,322,933 B2
(45) Date of Patent: Jun. 18, 2019

(54) QUICK-START SYSTEM FOR PREPARING HYDROGEN VIA AQUEOUS METHANOL AND HYDROGEN PREPARATION METHOD

(71) Applicant: SHANGHAI HYDROGEN MOBILE REFRMER INSTRUMENT CO., LTD., Shanghai (CN)

(72) Inventors: Hua Xiang, Shanghai (CN); Defu Xiang, Shanghai (CN); Jingjing Sun, Shanghai (CN)

(73) Assignee: SHANGHAI HYDROGEN MOBILE REFRMER INSTRUMENT CO., LTD., Songjiang, Shanghai (CN)

( * ) Notice: Subject to any disclaimer, the term of this patent is extended or adjusted under 35 U.S.C. 154(b) by 418 days.

(21) Appl. No.: 15/036,810

(22) PCT Filed: Nov. 14, 2014

(86) PCT No.: PCT/CN2014/091145
§ 371 (c)(1),
(2) Date: May 14, 2016

(87) PCT Pub. No.: WO2015/070803
PCT Pub. Date: May 21, 2015

(65) Prior Publication Data
US 2016/0272491 A1  Sep. 22, 2016

(30) Foreign Application Priority Data

Nov. 18, 2013  (CN) .......................... 2013 1 0578086

(51) Int. Cl.
*B01J 8/04* (2006.01)
*C01B 3/32* (2006.01)
(Continued)

(52) U.S. Cl.
CPC ................. *C01B 3/323* (2013.01); *B01J 7/02* (2013.01); *B01J 8/0403* (2013.01); *B01J 19/242* (2013.01);
(Continued)

(58) Field of Classification Search
None
See application file for complete search history.

(56) References Cited

FOREIGN PATENT DOCUMENTS

CN         103058137 A  *  4/2013
CN         103387210 A  *  11/2013

OTHER PUBLICATIONS

CN103058137A English Translation (Year: 2013).*
CN103387210A English Translation (Year: 2013).*

* cited by examiner

*Primary Examiner* — Anita Nassiri-Motlagh
(74) *Attorney, Agent, or Firm* — Global IP Services; Tianhua Gu

(57) ABSTRACT

Disclosed are a quick-start system for preparing hydrogen via aqueous methanol, and hydrogen preparation method. The system comprises a liquid storage container, a raw material feeding device, a quick-start device, a hydrogen preparation equipment and a membrane separation device; the quick-start device comprises a first start device and a second start device; the first start device comprises a first heating mechanism and a first gasification pipeline, the first gasification pipeline is wound around the first heating mechanism; one end of the first gasification pipeline is connected to the liquid storage container, and methanol is fed into the first gasification pipeline via the raw material feeding device, for the first heating mechanism to heat and gasify; the hydrogen preparation equipment comprises a reforming chamber; the second start device comprises a second gasification pipeline, a main body of the second (Continued)

gasification pipeline is disposed in the reforming chamber; the methanol output by the first gasification pipeline and/or the second gasification pipeline heats the second gasification pipeline while heating the reforming chamber, to gasify the methanol in the second gasification pipeline. The present invention can be quickly started, while having less energy consumption and good practicability.

7 Claims, 2 Drawing Sheets

(51) Int. Cl.
  *C01B 3/50* (2006.01)
  *B01J 7/02* (2006.01)
  *C01B 3/56* (2006.01)
  *B01J 19/24* (2006.01)
(52) U.S. Cl.
  CPC ............ *B01J 19/243* (2013.01); *C01B 3/505* (2013.01); *C01B 3/56* (2013.01); *B01J 2208/00141* (2013.01); *B01J 2208/00415* (2013.01); *B01J 2208/00716* (2013.01); *B01J 2219/00083* (2013.01); *B01J 2219/00135* (2013.01); *B01J 2219/1944* (2013.01); *C01B 2203/0233* (2013.01); *C01B 2203/0405* (2013.01); *C01B 2203/0475* (2013.01); *C01B 2203/0811* (2013.01); *C01B 2203/0822* (2013.01); *C01B 2203/1223* (2013.01); *C01B 2203/1288* (2013.01); *C01B 2203/1604* (2013.01); *Y02P 20/128* (2015.11); *Y02P 30/30* (2015.11)

QUICK-START SYSTEM FOR PREPARING HYDROGEN VIA AQUEOUS METHANOL AND HYDROGEN PREPARATION METHOD

CROSS REFERENCE TO RELATED PATENT APPLICATION

The present application is the US national stage of PCT/CN2014/091145 filed on Nov. 14, 2014, which claims the priority of the Chinese patent applications No. 201310578086.1 filed on Nov. 18, 2013, which applications are incorporated herein by reference.

BACKGROUND OF THE PRESENT INVENTION

Field of Invention

The invention belongs to a technical field of hydrogen preparation, and relates to a hydrogen preparation system, and particularly relates to a quick-start system for preparing hydrogen via aqueous methanol; meanwhile, the invention further relates to a quick-start method for preparing hydrogen via the aqueous methanol.

Description of Related Arts

Hydrogen energy will become the best energy source in numerous new energy sources in the 21st century. This is because, in the case of combusting coal, gasoline and hydrogen of an identical mass, hydrogen produces the most energy with a combustion product of water instead of ash and exhaust gas and without polluting the environment; whereas the coal and petroleum produce combustion products of carbon dioxide and sulfur dioxide, which may cause a greenhouse effect and acid rain respectively. The coal and oil reserves are limited, while hydrogen mainly exists in water, and the only combustion product is water as well, which may continuously produce hydrogen and would never run out.

Hydrogen is colorless gas. It may release a heat amount of 142 kJ per one gram of hydrogen, which is three times of the heating value of gasoline. Hydrogen is particularly light in weight and is much lighter than the gasoline, natural gas and kerosene, with the result of convenient carrying and transportation, and being used as the most suitable fuel for high-speed flying vehicles of aviation and aerospace and the like. Hydrogen is combustible in oxygen and has a flame temperature up to 2500° C., and is widely used to cut or weld steel materials accordingly.

Hydrogen is widespread in nature. Water is a large warehouse for hydrogen and contains 11% of hydrogen therein. Soil contains about 1.5% of hydrogen; Hydrogen is also comprised in petroleum, coal, natural gas, animals and plants, etc. Hydrogen exists in a form of a compound of water, while water covers about 70% of the earth's surface, leading to very large water storage, in other words, hydrogen is an inexhaustible energy source. If hydrogen can be prepared from water by using an appropriate method, hydrogen would be a relatively inexpensive energy source.

Hydrogen has wide applications and good suitability. It may not only serve as fuel, but also has a function of interconversion among chemical energy, heat energy and mechanical energy as a metal hydride. For example, a hydrogen-reserving metal may have functions of both hydrogen-absorbing exotherm and hydrogen-discharging endotherm, by which heat can be stored for heating and air conditioning at room.

Hydrogen was firstly used in cars as a gas fuel. The united states developed a car by using the hydrogen as the fuel in May, 1976; afterwards, Japan also developed a car by using liquid hydrogen as the fuel; In late 1970s, the Benz Automobile Corporation in the former United Germany carried out experiments on hydrogen, and they drove a car for 110 kilometers by merely using five kilograms of hydrogen.

It is not only clean and easy to start up at low temperature, but also has small corrosion effect on the engine and prolongs the service life of the engine by using hydrogen as the automobile fuel. Since hydrogen and air can be mixed uniformly, it may completely omit carburetors which are generally used in cars, so as to simplify structures of the known vehicles. More interestingly, if only 4% of hydrogen is added into gasoline, which is further used as the fuel of the automobile engine, it may save 40% of gasoline without performing large improvement on the automobile engine.

Hydrogen is easy to become liquid under a certain pressure and temperature, and thus is convenient for transportation by a railway tanker, highway trailer or ship. Liquid hydrogen can be used as fuel for cars and airplanes, as well as rockets and missiles. The Apollo spacecraft flying to the moon in the United States, as well as the Long March launch vehicle for launching an artificial satellite in our country, uses the liquid hydrogen as the fuel.

Besides, it may directly convert the hydrogen energy into electric energy by using a hydrogen-hydrogen fuel battery, which makes the usage of the hydrogen energy more convenient. Currently, such kind of fuel battery has been used in a spacecraft and a submarine with good effects. Naturalness, it is not widely used at present due to the high cost.

Nowadays, the annual production volume of hydrogen in the world is about 36 million tons, the most of which is prepared from petroleum, coal and natural gas, and further consumes the fossil fuel that is inherently critical; while another 4% of hydrogen is prepared by electrolysis of water, which, however, consumes much electric energy and is not cost-effective; as a result, new methods for preparing hydrogen have been actively explored. It may reduce energy consumption and lower cost in chemical production by reforming methanol and water to prepare hydrogen, which is expected to replace the water-electrolytic hydrogen making technology called as an electricity guzzler; the technology utilizes an advanced methanol steam reforming-pressure swing adsorption process to prepare pure hydrogen and a $CO_2$-rich gas mixture, and after a further post-treatment, hydrogen and carbon dioxide can be obtained at the same time.

The methanol and water vapor pass through a catalyst under a certain temperature and pressure condition, and further take place a methanol cracking reaction and a transformation reaction with carbon monoxide in the presence of the catalyst to form hydrogen and carbon dioxide, which is a multi-component and multi-reactions gas-solid catalytic reaction system. The reaction equations are as below:

$$CH_3OH \rightarrow CO + 2H_2 \quad (1)$$

$$CH_3OH \rightarrow CO + 2H_2 \quad (2)$$

$$CH_3OH + H_2O \rightarrow CO_2 + 3H_2 \quad (3)$$

The $H_2$ and $CO_2$, which are generated by the reforming reaction, are separated by a palladium membrane separation, to obtain high-purity hydrogen. The pressure swing adsorption method has high energy consumption and requires for a large equipment, and is not suitable for mini-scale hydrogen preparation.

The existing hydrogen preparation devices usually require for a long time for a cold boot, which is generally above five hours, and some devices even require for one day for a boot. While a warm boot requires to consume a large amount of energy source, to cause a reforming chamber (which generally requires for a temperature higher than 400° C.) or the like in a state of high temperature.

Therefore, the urgent problem need to be solved in the art is that how to achieve a fast cool boot and an assurance of energy saving (and good practicability as well) of the hydrogen preparation device.

SUMMARY OF THE PRESENT INVENTION

The technical problem to be solved in the invention is to: provide a quick-start system for preparing hydrogen via aqueous methanol, which can be quickly started, while having less energy consumption and good practicability.

Moreover, the invention further provides a quick-start method for preparing hydrogen via aqueous methanol, which can be quickly started to prepare hydrogen, while having less energy consumption and good practicability.

In order to solve the above technical problem, the invention adopts the following technical solutions:

a quick-start system for preparing hydrogen via aqueous methanol comprising: a liquid storage container, a raw material feeding device, a quick-start device, a hydrogen preparation equipment and a membrane separation device;

the hydrogen preparation equipment comprises a heat exchanger, a vaporizing chamber and a reforming chamber; the membrane separation device is deposited in a separation chamber which is deposited in the upper part inside the reforming chamber;

the liquid storage container is connected to the hydrogen preparation equipment; the liquid storage container is stored with liquid methanol and water;

the quick-start device provides start energy for the hydrogen preparation equipment; the quick-start device comprises a first start device and a second start device; the first start device comprises a first heating mechanism and a first gasification pipeline with an inner diameter of 1-2 mm, the first gasification pipeline is wound around the first heating mechanism; one end of the first gasification pipeline is connected to the liquid storage container and methanol is fed into the first gasification pipeline via the raw material feeding device; the other end of the first gasification pipeline outputs gasified methanol, which is further ignition and combustion by an ignition mechanism; or, the other end of the first gasification pipeline outputs gasified methanol, the temperature of which reaches a spontaneous ignition point thereof, and thus the methanol is directly self-ignited after being output from the first gasification pipeline; the second start device comprises a second gasification pipeline, a main body of the second gasification pipeline is disposed in the reforming chamber, the methanol output by the first gasification pipeline and/or the second gasification pipeline heats the second gasification pipeline while heating the reforming chamber, and gasifying the methanol in the second gasification pipeline; the reforming chamber is provided with a heating pipeline at an inner wall thereof, the heating pipeline is placed with a catalyst; the quick-start device heats the reforming chamber by heating the heating pipeline;

after activation, the hydrogen preparation system provides energy source for operations by the hydrogen prepared by the hydrogen preparation equipment;

the methanol and water in the liquid storage container are transported to the heat exchanger via the raw material feeding device for heat exchange, and further entered in the vaporizing chamber for gasification after the heat exchange; the gasify methanol vapor and water vapor enter the reforming chamber, the reforming chamber is provided with the catalyst, a lower part and a middle part of the reforming chamber has a temperature of 300° C.-420° C.;

an upper part of the reforming chamber has a temperature of 400° C.-570° C.; the reforming chamber is connected with the separation chamber through a connecting pipeline, while entire or a part of the connecting pipeline is deposited at the upper part of the reforming chamber, by which it enables to further heat the gas output from the reforming chamber by the high temperature at the upper part of the reforming chamber; the connecting pipeline serves as a buffer between the reforming chamber and the separation chamber, so that the temperature of the gas output from the reforming chamber is same with or close to the temperature of the separation chamber;

the temperature in the separation chamber is set as 350° C.-570° C.; the separation chamber is provided with a membrane separator therein, the hydrogen is obtained at a gas production end of the membrane separator;

the raw material feeding device provides power to transport raw material in the liquid storage container to the hydrogen preparation equipment; the raw material feeding device provides a pressure of 0.15-5 MPa for the raw material, so that the hydrogen prepared by the hydrogen preparation equipment may have enough pressure;

after the hydrogen preparation equipment is activated to prepare hydrogen, some hydrogen or/and residual gas prepared by the hydrogen preparation equipment are combusted to maintain the operation of the hydrogen preparation equipment;

the hydrogen prepared by the hydrogen preparation equipment are transported to the membrane separation device for separation, wherein a pressure difference between the inside and outside of the membrane separation device for separating hydrogen is larger than or equal to 0.7M Pa;

the membrane separation device is the membrane separation device that is vacuum plated with a palladium-silver alloy on a porous ceramic surface, wherein the coating layer is the palladium-silver alloy with mass percent palladium of 75%-78% and mass percent silver of 22%-25%.

A quick-start system for preparing hydrogen via aqueous methanol comprising: a liquid storage container, a raw material feeding device, a quick-start device, a hydrogen preparation equipment and a membrane separation device;

the quick-start device provides activation energy for the hydrogen preparation equipment; the quick-start device comprises a first start device and a second start device;

the first start device comprises a first heating mechanism and a first gasification pipeline, the first gasification pipeline is wound around the first heating mechanism;

one end of the first gasification pipeline is connected to the liquid storage container and methanol is fed into the first gasification pipeline via the raw material feeding device, the other end of the first gasification pipeline outputs gasified methanol, which is further ignition and combustion by an ignition mechanism; or, the other end of the first gasification pipeline outputs gasified methanol, the temperature of which reaches a spontaneous ignition point thereof, and thus the methanol is directly self-ignited after being output from the first gasification pipeline;

the hydrogen preparation equipment comprises a reforming chamber; the second start device comprises a second gasification pipeline, a main body of the second gasification pipeline is disposed in the reforming chamber, and the methanol outputted by the first gasification pipeline and/or the second gasification pipeline heats the second gasification pipeline while heating the reforming chamber, to gasify the methanol in the second gasification pipeline.

As a preferred solution of the invention, the reforming chamber is provided with a heating pipeline at an inner wall thereof, the heating pipeline is placed with a catalyst; the quick-start device heats the reforming chamber by heating the heating pipeline;

As a preferred solution of the invention, the raw material feeding device provides power to transport raw material in the liquid storage container to the hydrogen preparation equipment; the raw material feeding device provides a pressure of 0.15-5 MPa for the raw material, so that the hydrogen prepared by the hydrogen preparation equipment may have enough pressure;

after the hydrogen preparation equipment is activated to prepare hydrogen, some hydrogen or/and residual gas prepared by the hydrogen preparation equipment are combusted to maintain the operation of the hydrogen preparation equipment;

the hydrogen prepared by the hydrogen preparation equipment are transported to the membrane separation device for separation, wherein a pressure difference between the inside and outside of the membrane separation device for separating hydrogen is larger than or equal to 0.7M Pa;

As a preferred solution of the invention, the membrane separation device is a membrane separation device that is vacuum plated with a palladium-silver alloy on a porous ceramic surface, wherein the coating layer is the palladium-silver alloy with mass percent palladium of 75%-78% and mass percent silver of 22%-25%.

A hydrogen preparation method of the system for preparing hydrogen via aqueous methanol, comprising steps of:

step S1, a quick-start step; activating the hydrogen preparation system by using activation energy provided by the quick-start device; specifically comprises:

the first heating mechanism of the first start device is electrified to set a time, methanol is fed into the first gasification pipeline after the first heating mechanism reaches a preset temperature; since the first gasification pipeline is closely wound around the first heating mechanism, the methanol temperature gradually rises; the first gasification pipeline outputs gasified methanol, which is further ignition and combustion by the ignition mechanism; or, the first gasification pipeline outputs gasified methanol, the temperature of which reaches a spontaneous ignition point thereof, and thus the methanol is directly self-ignited after being output from the first gasification pipeline;

the gasified methanol releases heat by combustion to provide activation energy for the hydrogen preparation equipment; in the meanwhile, combustion of the methanol output by the first gasification pipeline also heats the second gasification pipeline of the second start device to gasify the methanol in the second gasification pipeline;

after the second gasification pipeline outputs the gasified methanol, the first start device is shut down, the methanol output by the second gasification pipeline of the second start device heats the second gasification pipeline while heating the reforming chamber, to gasify the methanol in the second gasification pipeline; the reforming chamber is provided with a heating pipeline at an inner wall thereof, the heating pipeline is placed with a catalyst; the quick-start device heats the reforming chamber by heating the heating pipeline;

step S2, providing energy for operation by the hydrogen prepared by the hydrogen preparation equipment after the hydrogen preparation system is activated; after sufficient hydrogen is prepared by the operation of the hydrogen preparation equipment, the quick-start device is shut down, and some hydrogen or/and residual gas prepared by the hydrogen preparation equipment are combusted to maintain the operation of the hydrogen preparation equipment; the hydrogen preparation process specifically comprises:

the methanol and water in the liquid storage container are transported to the heat exchanger of the hydrogen preparation equipment via the raw material feeding device for heat exchange, and further entered in the vaporizing chamber for gasification after the heat exchange; the gasified methanol vapor and water vapor enter the reforming chamber, the reforming chamber is provided with a catalyst, a lower part and a middle part of the reforming chamber has a temperature of 300° C.-420° C.

an upper part of the reforming chamber has a temperature of 400° C.-570° C.; the reforming chamber is connected to the separation chamber through a connecting pipeline, while entire or a part of the connecting pipeline is deposited at the upper part of the reforming chamber, by which it enables to further heat the gas output from the reforming chamber by the high temperature at the upper part of the reforming chamber; the connecting pipeline serves as a buffer between the reforming chamber and the separation chamber, so that the temperature of the gas output from the reforming chamber is same with or close to the temperature of the separation chamber;

the temperature in the separation chamber is set as 350° C.-570° C.; the separation chamber is provided with a membrane separator therein, and hydrogen is obtained at a gas production end of the membrane separator; the raw material feeding device provides power to transport the raw material in the liquid storage container to the hydrogen preparation equipment; the raw material feeding device provides a pressure of 0.15-5 MPa for the raw material, so that the hydrogen prepared by the hydrogen preparation equipment may have enough pressure; the hydrogen prepared by the hydrogen preparation equipment are transported to the membrane separation device for separation, wherein a pressure difference between the inside and outside of the membrane separation device for separating hydrogen is larger than or equal to 0.7M Pa; the membrane separation device is the membrane separation device that is vacuum plated with a palladium-silver alloy on a porous ceramic surface, wherein the coating layer is the palladium-silver alloy with mass percent palladium of 75%-78% and mass percent silver of 22%-25%;

after the hydrogen preparation equipment is activated to prepare hydrogen, some hydrogen or/and residual gas prepared by the hydrogen preparation equipment are combusted to maintain the operation of the hydrogen preparation equipment.

A hydrogen preparation method of the system for preparing hydrogen via aqueous methanol, comprising steps of:

step S1, a quick-start step: activating the hydrogen preparation system by using the activation energy provided by the quick-start device; specifically comprises:

the first gasification pipeline is fed with methanol, and the methanol is heated and gasified by the first heating mechanism;

the first gasification pipeline outputs the gasified methanol, which is further ignition and combustion by the ignition mechanism; or, the first gasification pipeline outputs the gasified methanol, the temperature of which reaches a spontaneous ignition point thereof, and thus the methanol is directly self-ignited after being output from the first gasification pipeline;

the gasified methanol releases heat by combustion to provide activation energy for the hydrogen preparation equipment; in the meanwhile, combustion of the methanol output by the first gasification pipeline also heats the second gasification pipeline of the second start device to gasify the methanol in the second gasification pipeline;

after the second gasification pipeline outputs the gasified methanol, the first start device is shut down after the preset time, the methanol output by the second gasification pipeline of the second start device heats the second gasification pipeline while heating the hydrogen preparation equipment, to gasify the methanol in the second gasification pipeline;

the gasified methanol releases heat by combustion to provide the activation energy for the hydrogen preparation equipment;

As a preferred solution of the invention, the step S2 specifically comprises:

the first heating mechanism of the first start device is electrified to set a time, the methanol is fed into the first gasification pipeline after the first heating mechanism reaches a preset temperature; since the first gasification pipeline is closely wound around the first heating mechanism, the methanol temperature gradually rises; the first gasification pipeline outputs the gasified methanol, which is further ignition and combustion by the ignition mechanism; or, the first gasification pipeline outputs the gasified methanol, the temperature of which reaches a spontaneous ignition point thereof, and thus the methanol is directly self-ignited after being output from the first gasification pipeline;

the gasified methanol releases heat by combustion to provide the activation energy for the hydrogen preparation equipment; in the meanwhile, the combustion of the methanol output by the first gasification pipeline also heats the second gasification pipeline of the second start device to gasify the methanol in the second gasification pipeline;

after the second gasification pipeline outputs the gasified methanol, the first start device is shut down, the methanol output by the second gasification pipeline of the second start device heats the second gasification pipeline while heating the reforming chamber, to gasify the methanol in the second gasification pipeline.

As a preferred solution of the invention, in step S1, the reforming chamber is provided with a heating pipeline at an inner wall thereof, the heating pipeline is placed with a catalyst; the quick-start device heats the reforming chamber by heating the heating pipeline;

As a preferred solution of the invention, the hydrogen preparation method specifically comprises: after activation, the hydrogen preparation equipment provides energy for operation by the hydrogen prepared by the hydrogen preparation equipment; after sufficient hydrogen is prepared by the operation of the hydrogen preparation system, the quick-start device is shut down; some hydrogen or/and residual gas prepared by the hydrogen preparation equipment are combusted to maintain the operation of the hydrogen preparation equipment; the hydrogen preparation process specifically comprises:

the methanol and water in the liquid storage container are transported to the heat exchanger of the hydrogen preparation equipment via the raw material feeding device for heat exchange, and further entered in the vaporizing chamber for gasification after the heat exchange; the gasify methanol vapor and water vapor enter the reforming chamber, the reforming chamber is provided with a catalyst, and a lower part and a middle part of the reforming chamber has a temperature of 300° C.-420° C.

an upper part of the reforming chamber has a temperature of 400° C.-570° C.; the reforming chamber is connected to the separation chamber through a connecting pipeline, while entire or a part of the connecting pipeline is deposited at the upper part of the reforming chamber, by which it enables to further heat the gas output from the reforming chamber by the high temperature at the upper part of the reforming chamber; the connecting pipeline serves as a buffer between the reforming chamber and the separation chamber, so that the temperature of the gas output from the reforming chamber is same with or close to the temperature of the separation chamber;

the temperature in the separation chamber is set as 350° C.-570° C.; the separation chamber is provided with a membrane separator therein, and the hydrogen is obtained at a gas production end of the membrane separator; the raw material feeding device provides power to transport the raw material in the liquid storage container to the hydrogen preparation equipment; the raw material feeding device provides a pressure of 0.15-5 MPa for the raw material, so that the hydrogen prepared by the hydrogen preparation equipment may have enough pressure; the hydrogen prepared by the hydrogen preparation equipment are transported to the membrane separation device for separation, wherein a pressure difference between the inside and outside of the membrane separation device for separating hydrogen is larger than or equal to 0.7M Pa; the membrane separation device is the membrane separation device that is vacuum plated with a palladium-silver alloy on a porous ceramic surface, wherein the coating layer is the palladium-silver alloy with mass percent palladium of 75%-78% and mass percent silver of 22%-25%.

The invention has beneficial effects that: the quick-start system for preparing hydrogen via aqueous methanol provided by the invention can be quickly started, and the process generally takes less than 10 minutes; in the meanwhile, the hydrogen preparation system merely requires for electric energy at the beginning of the activation stage to cause a heating rod to gasify the methanol, and hence consumes little energy; generally two batteries is sufficient (the hydrogen preparation system is available for a small-sized hydrogen making machine that is easy to move). Therefore, the invention has good practicability, and can be cooperated with a hydrogen generator for daily use.

Moreover, by improving transportation power of the raw material feeding device, the hydrogen prepared by the hydrogen preparation equipment can have sufficient pressure, and hydrogen preparation efficiency and purity of the prepared hydrogen can be improved.

DETAILED DESCRIPTION OF THE PREFERRED EMBODIMENTS

Hereinafter, the preferred embodiments of the present invention will be described in details with reference to the accompanying drawings.

Embodiment 1

Figure 1:
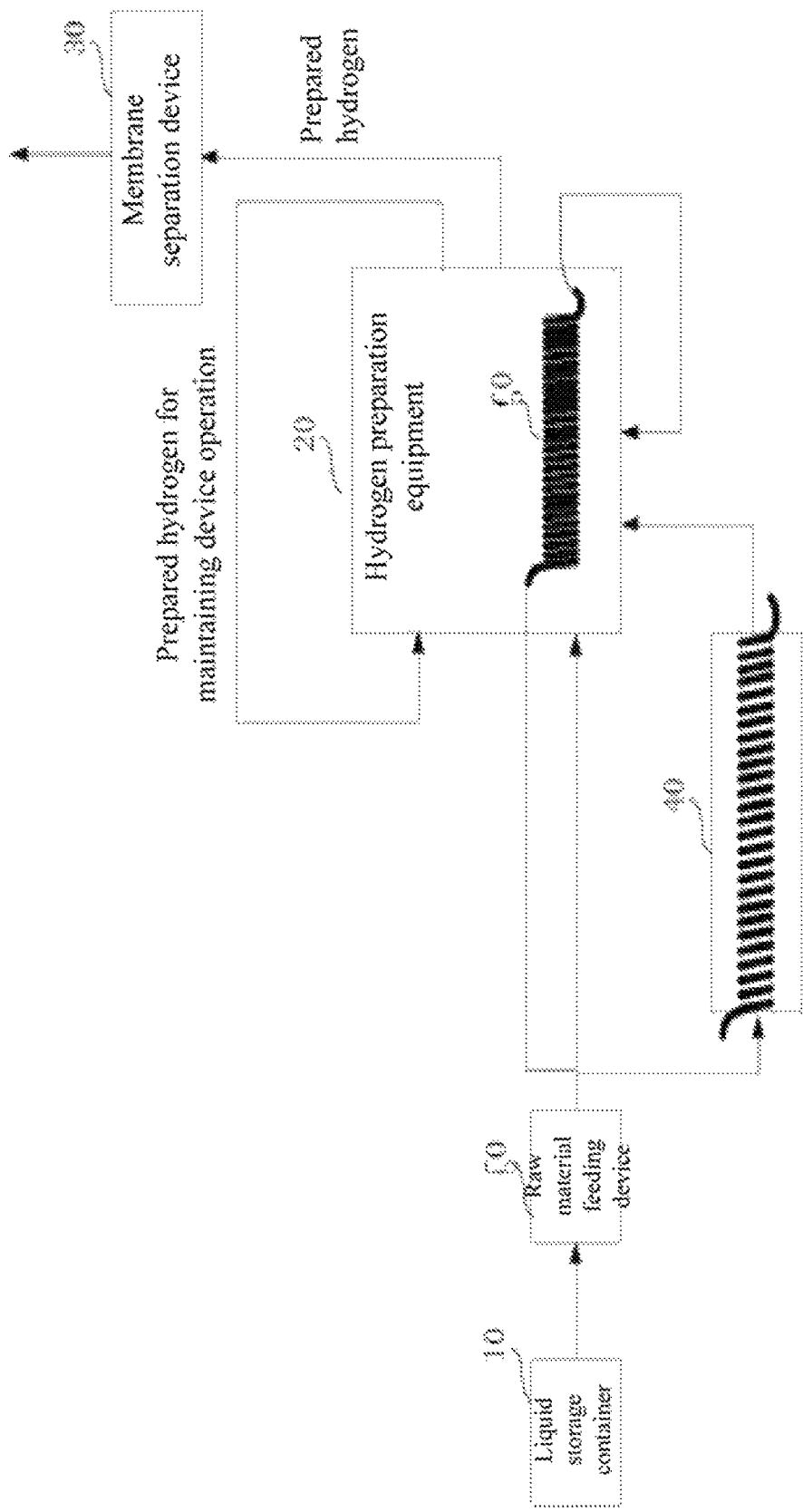
FIG. 1 is a schematic diagram showing the composition of a quick-start system for preparing hydrogen via aqueous methanol of the invention.

Please refer to FIG. 1, the invention discloses a quick-start system for preparing hydrogen via aqueous methanol, which comprises: a liquid storage container 10, a raw material feeding device 50, a quick-start device, a hydrogen preparation equipment 20 and a membrane separation device 30. The quick-start device provides activation energy for the hydrogen preparation equipment; the quick-start device comprises a first start device 40 and a second start device 60.

Figure 2:
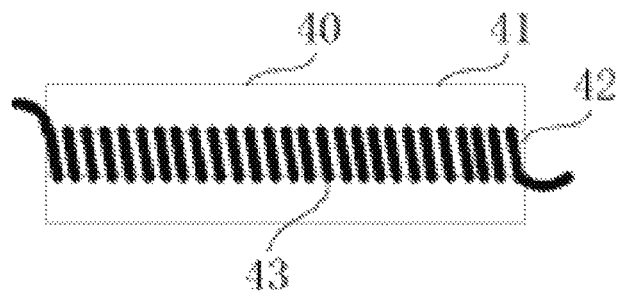
FIG. 2 is a schematic diagram of a quick-start device of the hydrogen preparation system of the invention.

As shown in FIG. 2, the first start device 40 comprises a housing 41, a first heating mechanism 42 and a first gasification pipeline 43 with an inner diameter of 1-2 mm, the first gasification pipeline 43 is closely wound around the first heating mechanism 42; the first heating mechanism 42 may be an electrical heating rod that utilizes alternating current, a storage battery or a dry battery.

One end of the first gasification pipeline 43 is connected to the liquid storage container 10, methanol is fed into the first gasification pipeline 43; the other end of the first gasification pipeline 43 outputs gasified methanol, which is further ignition and combustion by an ignition mechanism; or, the other end of the first gasification pipeline 43 outputs the gasified methanol, the temperature of which reaches a spontaneous ignition point thereof, and thus the methanol is directly self-ignited after being output from the first gasification pipeline 43.

The second start device 60 comprises a second gasification pipeline, a main body of the second gasification pipeline is disposed in the reforming chamber, the second gasification pipeline heats the reforming chamber (as well as other units in the hydrogen preparation system). The methanol output from the first gasification pipeline 43 or/and the second gasification pipeline heats the second gasification pipeline while heating the reforming chamber, to gasify the methanol in the second gasification pipeline.

Firstly, it needs the methanol output from the first gasification pipeline 43 to heat the second gasification pipeline, and sets a time after the second gasification pipeline can continuously produce gasified methanol, it may choose to shut down the first start device 40 and heat the second gasification pipeline by the methanol output from the second gasification pipeline; thereby, it may further reduce the dependence on external energy source.

Figure 3:
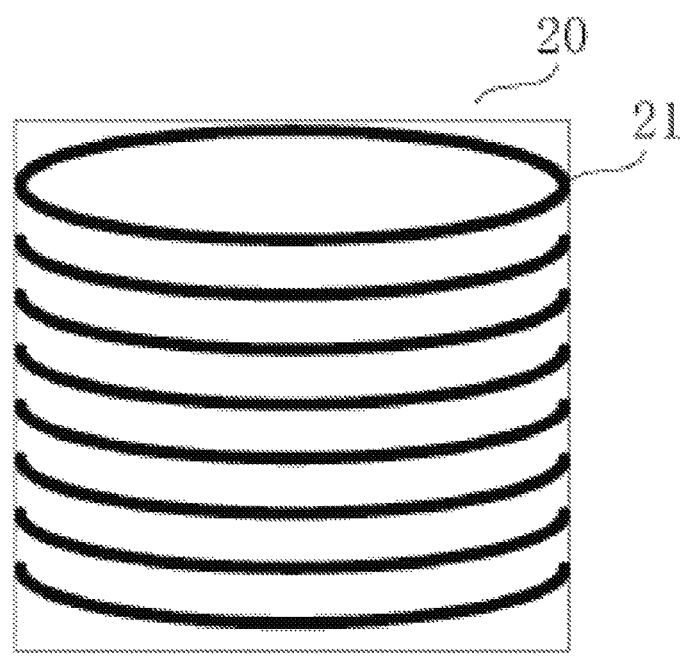
FIG. 3 is a schematic diagram of a hydrogen preparation equipment and a heating pipeline thereof.

Please refer to FIG. 3, in order to improve the heating rate of the hydrogen preparation equipment, the reforming chamber of the hydrogen preparation equipment 20 is provided with a heating pipeline 21 at the inner wall thereof, the heating pipeline 21 is placed with a catalyst (the heating temperature is controlled as 380° C.-480° C. if possible); the quick-start device 40 heats the reforming chamber by heating the heating pipeline 21, which may help to improve the heating efficiency.

After the hydrogen preparation system is activated, the hydrogen preparation system provides energy for operation by the hydrogen prepared by the hydrogen preparation equipment; at this time, it may shut down the quick-start device.

The above describes the components of the hydrogen preparation system via aqueous methanol of the invention; the invention further discloses a hydrogen preparation method of the hydrogen preparation system via aqueous methanol while disclosing the above hydrogen preparation system, and the method comprises steps of:

[step S1] a quick-start step: activating the hydrogen preparation system by using the activation energy provided by the quick-start device, which specifically comprises:

the first heating mechanism of the first start device is electrified to set a time, the methanol is fed into the first gasification pipeline after the first heating mechanism reaches a preset temperature; since the first gasification pipeline is closely wound around the first heating mechanism, the methanol temperature gradually rises; the first gasification pipeline outputs gasified methanol, which is further ignition and combustion by the ignition mechanism; or, the first gasification pipeline outputs the gasified methanol, the temperature of which reaches a spontaneous ignition point thereof, and thus the methanol is directly self-ignited after being output from the first gasification pipeline;

the gasified methanol releases heat by combustion to provide the activation energy for the hydrogen preparation equipment; in the meanwhile, the combustion of the methanol output by the first gasification pipeline also heats the second gasification pipeline of the second start device to gasify the methanol in the second gasification pipeline;

after the second gasification pipeline outputs the gasified methanol, the first start device is shut down, the methanol output by the second gasification pipeline of the second start device heats the second gasification pipeline while heating the reforming chamber, to gasify the methanol in the second gasification pipeline; the reforming chamber is provided with a heating pipeline at an inner wall thereof, the heating pipeline is placed with a catalyst; the quick-start device heats the reforming chamber by heating the heating pipeline;

[step S2] after the system is activated, the hydrogen preparation system provides energy for operation by the hydrogen prepared by the hydrogen preparation equipment; after sufficient hydrogen is prepared by the operation of the hydrogen preparation system, the quick-start device is shut down; some hydrogen or/and residual gas prepared by the hydrogen preparation equipment are combusted to maintain the operation of the hydrogen preparation equipment.

Embodiment 2

The present embodiment differs from the first embodiment in that, in the present embodiment, the hydrogen preparation system via aqueous methanol of the invention comprises: a liquid storage container, a raw material feeding device, a quick-start device, a hydrogen preparation equipment and a membrane separation device.

The hydrogen preparation equipment comprises a heat exchanger, a vaporizing chamber and a reforming chamber; the membrane separation device is deposited in a separation chamber, which is deposited at the upper part inside the reforming chamber. The liquid storage container is connected to the hydrogen preparation equipment; the liquid storage container is stored with liquid methanol and water.

The methanol and water in the liquid storage container are transported to the heat exchanger via the raw material feeding device for heat exchange, and further entered in the vaporizing chamber for gasification after the heat exchange; the gasify methanol vapor and water vapor enter the reforming chamber, the reforming chamber is provided with a catalyst, a lower part and a middle part of the reforming chamber has a temperature of 300° C.-420° C. An upper part of the reforming chamber has a temperature of 400° C.-570° C.; the reforming chamber is connected to the separation chamber through a connecting pipeline, while entire or a part of the connecting pipeline is deposited at the upper part of the reforming chamber, by which it enables to further heat the gas output from the reforming chamber by the high temperature at the upper part of the reforming chamber; the connecting pipeline serves as a buffer between the reforming chamber and the separation chamber, so that the temperature of the gas output from the reforming chamber is same with or close to the temperature of the separation chamber. The temperature in the separation chamber is set as 350° C.-570° C.; the separation chamber is provided with a membrane separator therein, and the hydrogen is obtained at a gas production end of the membrane separator. In view of the above improvement, it may ensure the low temperature requirement of the catalyst in the reforming chamber as well as the high temperature requirement of the separation chamber, so as to improve the efficiency for preparing hydrogen; in the meanwhile, preheating manners of the invention is very convenient (wherein the separation chamber is deposited at the upper part of the reforming chamber).

Moreover, the raw material feeding device provides power to transport the raw material in the liquid storage container to the hydrogen preparation equipment; the raw material feeding device provides a pressure of 0.15-5 MPa for the raw material, so that the hydrogen prepared by the hydrogen preparation equipment may have enough pressure; the hydrogen prepared by the hydrogen preparation equipment is transported to the membrane separation device for separation, wherein the pressure difference between the inside and outside of the membrane separation device for separating hydrogen is larger than or equal to 0.7M Pa. In view of the improvement, the hydrogen prepared by the hydrogen preparation equipment may have sufficient pressure, and hydrogen preparation efficiency and purity of the prepared hydrogen may be improved.

After the hydrogen preparation equipment is activated to prepare hydrogen, some hydrogen or/and residual gas prepared by the hydrogen preparation equipment are combusted to maintain the operation of the hydrogen preparation equipment, thereby it may reduce the dependence on the external energy source and have strong adaptability.

The membrane separation device is the membrane separation device that is vacuum plated with a palladium-silver alloy on a porous ceramic surface, wherein the coating layer is the palladium-silver alloy with mass percent palladium of 75%-78% and mass percent silver of 22%-25%. The invention utilizes the palladium membrane separation device to better the purity of the hydrogen.

The invention also discloses a hydrogen preparation method of the hydrogen preparation system via aqueous methanol, which comprises steps of:

[step S1] a quick-start step: activating the hydrogen preparation system by using the activation energy provided by the quick-start device, which specifically comprises:

the first heating mechanism of the first start device is electrified to set a time, the methanol is fed into the first gasification pipeline after the first heating mechanism reaches a preset temperature; since the first gasification pipeline is closely wound around the first heating mechanism, the methanol temperature gradually rises; the first gasification pipeline outputs gasified methanol, which is further ignition and combustion by the ignition mechanism; or, the first gasification pipeline outputs the gasified methanol, the temperature of which reaches a spontaneous ignition point thereof, and thus the methanol is directly self-ignited after being output from the first gasification pipeline;

the gasified methanol releases heat by combustion to provide the activation energy for the hydrogen preparation equipment; in the meanwhile, the combustion of the methanol output by the first gasification pipeline also heats the second gasification pipeline of the second start device to gasify the methanol in the second gasification pipeline;

after the second gasification pipeline outputs the gasified methanol, the first start device is shut down, the methanol output by the second gasification pipeline of the second start device heats the second gasification pipeline while heating the reforming chamber, to gasify the methanol in the second gasification pipeline; to reforming chamber is provided with a heating pipeline at an inner wall thereof, the heating pipeline is placed with a catalyst; the quick-start device heats the reforming chamber by heating the heating pipeline.

[step S2] After the system is activated, the hydrogen preparation system provides energy for operation by the hydrogen prepared by the hydrogen preparation equipment; after sufficient hydrogen is prepared by the operation of the hydrogen preparation equipment, the quick-start device is shut down, some hydrogen or/and residual gas prepared by the hydrogen preparation equipment are combusted to maintain the operation of the hydrogen preparation equipment.

The hydrogen preparation process specifically comprises:

the methanol and water in the liquid storage container are transported to the heat exchanger of the hydrogen preparation equipment via the raw material feeding device for heat exchange, and further entered in the vaporizing chamber for gasification after the heat exchange; the gasify methanol vapor and water vapor enter the reforming chamber, the reforming chamber is provided with a catalyst, a lower part and a middle part of the reforming chamber has a temperature of 300° C.-420° C. An upper part of the reforming chamber has a temperature of 400° C.-570° C.; the reforming chamber is connected to the separation chamber through a connecting pipeline, while entire or a part of the connecting pipeline is deposited at the upper part of the reforming chamber, by which it enables to further heat the gas output from the reforming chamber by the high temperature at the upper part of the reforming chamber; the connecting pipeline serves as a buffer between the reforming chamber and the separation chamber, so that the temperature of the gas output from the reforming chamber is same with or close to the temperature of the separation chamber.

The temperature in the separation chamber is set as 350° C.-570° C.; the separation chamber is provided with a membrane separator therein, and the hydrogen is obtained at a gas production end of the membrane separator; the raw material feeding device provides power to transport the raw material in the liquid storage container to the hydrogen preparation equipment; the raw material feeding device provides a pressure of 0.15-5 MPa for the raw material, so that the hydrogen prepared by the hydrogen preparation equipment may have enough pressure; the hydrogen prepared by the hydrogen preparation equipment are transported to the membrane separation device for separation, wherein the pressure difference between the inside and outside of the membrane separation device for separating hydrogen is larger than or equal to 0.7M Pa. The membrane separation device is the membrane separation device that is vacuum plated with a palladium-silver alloy on a porous ceramic surface, wherein the coating layer is the palladium-silver alloy with mass percent palladium of 75%-78% and mass percent silver of 22%-25%.

After the hydrogen preparation equipment is activated to prepare hydrogen, some hydrogen or/and residual gas prepared by the hydrogen preparation equipment are combusted to maintain the operation of the hydrogen preparation equipment.

From the above, the quick-start system for preparing hydrogen via aqueous methanol provided by the invention can be quickly started, and the process generally takes less than 10 minutes; in the meanwhile, the hydrogen preparation system merely requires for electric energy at the beginning of the activation stage to cause a heating rod to gasify the methanol, and hence consumes little energy; generally two batteries is sufficient (the hydrogen preparation system is available for a small-sized hydrogen making machine that is easy to move). Therefore, the invention has good practicability, and can be cooperated with a hydrogen generator for daily use.

Moreover, by improving transportation power of the raw material feeding device, the hydrogen prepared by the hydrogen preparation equipment can have sufficient pressure, and hydrogen preparation efficiency and purity of the prepared hydrogen can be improved.

The descriptions and applications described herein are illustrative only, and are not intended to limit the scope of the invention in the above embodiments. Modifications and variations of the disclosed embodiments herein are also possible, other substitutions and equivalents of various components in the embodiments are well-known to those skilled in the art. It will be clear to those skilled in the art that the present invention may be achieved by other forms, structures, arrangements, proportions, and with other elements, materials and components, without departing from the spirit or essential characteristics thereof. Other changes and modifications of the embodiments described herein can be made without departing from the spirit or scope of the inventions.

What is claimed is:

1. A quick-start device for a system preparing hydrogen via aqueous methanol comprising: the system preparing hydrogen via aqueous methanol comprising: a liquid storage container for storing liquid methanol and water; a hydrogen preparation equipment for preparing hydrogen via aqueous methanol, which comprises a heat exchanger, a vaporizing chamber and a reforming chamber; a membrane separation device for separating hydrogen from the gas output from the reforming chamber, which is deposited in a separation chamber and is located at the upper part inside the reforming chamber, the quick-start device is for providing activation energy to the hydrogen preparation equipment, which comprises a first start device and a second start device; the first start device comprises a first heating mechanism and a first gasification pipeline, the first gasification pipeline is wound around the first heating mechanism, one end of the first gasification pipeline is connected to the liquid storage container via a raw material feeding device, other end of the first gasification pipeline is located under the reforming chamber for outputting gasified methanol the gasified methanol is further ignited and combusted by an ignition mechanism or directly self-ignited under temperature reaching a spontaneous ignition point thereof; the second start device comprises a second gasification pipeline, one end of the second gasification pipeline is connected to the liquid storage container via a raw material feeding device, other end of the second gasification pipeline is located under the reforming chamber for outputting gasified methanol, a main body of the second gasification pipeline is disposed in the reforming chamber, the methanol output by the first gasification pipeline and/or the second gasification pipeline heats the second gasification pipeline while heating the reforming chamber, to gasify the methanol in the second gasification pipeline; the reforming chamber is provided with a heating pipeline at an inner wall thereof the quick-start device heats the reforming chamber by heating the heating pipeline; the reforming chamber is provided with a catalyst a lower part and a middle part of the reforming chamber has a temperature of 300° C.-420° C.; after activation, the hydrogen preparation system provides energy source for operation by the hydrogen prepared by the hydrogen preparation equipment.

2. The quick-start device for a system preparing hydrogen via aqueous methanol as in claim 1, wherein:
an upper part of the reforming chamber has a temperature of 400° C.-570° C. the reforming chamber is connected to the separation chamber through a connecting pipeline, while entire or a part of the connecting pipeline is deposited at the upper part of the reforming chamber, by which it enables to further heat the gas output from the reforming chamber by the high temperature at the upper part of the reforming chamber, the connecting pipeline serves as a buffer between the reforming chamber and the separation chamber, so that the temperature of the gas output from the reforming chamber is same with or close to the temperature of the separation chamber.

3. The quick-start device for a system preparing hydrogen via aqueous methanol as in claim 1, wherein:
the raw material feeding device provides power to transport raw material in the liquid storage container to the hydrogen preparation equipment; the raw material feeding device provides a pressure of 0.15-5 MPa for the raw material, so that the hydrogen prepared by the hydrogen preparation equipment has enough pressure;
after the hydrogen preparation equipment is activated to prepare hydrogen, some hydrogen or/and residual gas prepared by the hydrogen preparation equipment are combusted to maintain the operation of the hydrogen preparation equipment;
the hydrogen prepared by the hydrogen preparation equipment are transported to the membrane separation device for separation, wherein the pressure difference between the inside and outside of the membrane separation device for separating hydrogen is larger than or equal to 0.7M Pa.

4. The quick-start device for a system preparing hydrogen via aqueous methanol as in claim 1, wherein:
the membrane separation device is the membrane separation device that is vacuum plated with a palladium-silver alloy on a porous ceramic surface, wherein the coating layer is the palladium-silver alloy with mass percent palladium of 75%-78% and mass percent silver of 22%-25%.

5. The hydrogen preparation method of the quick-start device for a system preparing hydrogen via aqueous methanol as in claim 1, wherein, the method comprises steps of:
step S1, a quick-start step: activating the hydrogen preparation system by using the activation energy provided by the quick-start device, which specifically comprises:
the first gasification pipeline is fed with methanol, and the methanol is heated and gasified by the first heating mechanism;
the first gasification pipeline outputs the gasified methanol, which is further ignition and combustion by the ignition mechanism; or, the first gasification pipeline outputs the gasified methanol, the temperature of which reaches a spontaneous ignition point thereof, and thus the methanol is directly self-ignited after being output from the first gasification pipeline;
the gasified methanol releases heat by combustion to provide activation energy for the hydrogen preparation equipment; in the meanwhile, combustion of the methanol output by the first gasification pipeline also heats the second gasification pipeline of the second start device to gasify the methanol in the second gasification pipeline;
after the second gasification pipeline outputs the gasified methanol, the first start device is shut down after a preset time, the methanol output by the second gasification pipeline of the second start device heats the second gasification pipeline while heating the hydrogen preparation equipment, to gasify the methanol in the second gasification pipeline;

the gasified methanol releases heat by combustion to provide the activation energy for the hydrogen preparation equipment.

6. The hydrogen preparation method as in claim 5, wherein:

the step S1 specifically comprises:

the first heating mechanism of the first start device is electrified to set a time, the methanol is fed into the first gasification pipeline after the first heating mechanism reaches a preset temperature; since the first gasification pipeline is closely wound around the first heating mechanism, the methanol temperature gradually rises; the first gasification pipeline outputs the gasified methanol, which is further ignition and combustion by the ignition mechanism; or, the first gasification pipeline outputs the gasified methanol, the temperature of which reaches a spontaneous ignition point thereof, and thus the methanol is directly self-ignited after being output from the first gasification pipeline;

the gasified methanol releases heat by combustion to provide the activation energy for the hydrogen preparation equipment; in the meanwhile, the combustion of the methanol output by the first gasification pipeline also heats the second gasification pipeline of the second start device to gasify the methanol in the second gasification pipeline;

after the second gasification pipeline outputs the gasified methanol, the first start device is shut down, the methanol output by the second gasification pipeline of the second start device heats the second gasification pipeline while heating the reforming chamber, to gasify the methanol in the second gasification pipeline.

7. The hydrogen preparation method as in claim 5, wherein:

the hydrogen preparation method further comprises a step S2: after activation, the hydrogen preparation system provides energy for operation by hydrogen prepared by the hydrogen preparation equipment; after sufficient hydrogen is prepared by the operation of the hydrogen preparation system, the quick-start device is shut down; some hydrogen or/and residual gas prepared by the hydrogen preparation equipment are combusted to maintain the operation of the hydrogen preparation equipment; the hydrogen preparation process specifically comprises:

the methanol and water in the liquid storage container are transported to the heat exchanger of the hydrogen preparation equipment via the raw material feeding device for heat exchange, and further entered in the vaporizing chamber for gasification after the heat exchange; the gasified methanol vapor and water vapor enter the reforming chamber, the reforming chamber is provided with a catalyst, a lower part and a middle part of the reforming chamber has a temperature of 300° C.-420° C.;

an upper part of the reforming chamber has a temperature of 400° C.-570° C.; the reforming chamber is connected to the separation chamber through a connecting pipeline, while entire or a part of the connecting pipeline is deposited at the upper part of the reforming chamber, by which it enables to further heat the gas output from the reforming chamber by the high temperature at the upper part of the reforming chamber; the connecting pipeline serves as a buffer between the reforming chamber and the separation chamber, so that the temperature of the gas output from the reforming chamber is same with or close to the temperature of the separation chamber;

the temperature in the separation chamber is set as 350° C.-570° C.; the separation chamber is provided with a membrane separator therein, and hydrogen is obtained at a gas production end of the membrane separator; the raw material feeding device provides power to transport the raw material in the liquid storage container to the hydrogen preparation equipment; the raw material feeding device provides a pressure of 0.15-5 MPa for the raw material, so that the hydrogen prepared by the hydrogen preparation equipment has enough pressure; the hydrogen prepared by the hydrogen preparation equipment are transported to the membrane separation device for separation, wherein the pressure difference between the inside and outside of the membrane separation device for separating hydrogen is larger than or equal to 0.7M Pa; the membrane separation device is the membrane separation device that is vacuum plated with a palladium-silver alloy on a porous ceramic surface, wherein the coating layer is the palladium-silver alloy with mass percent palladium of 75%-78% and mass percent silver of 22%-25%;

after the hydrogen preparation equipment is activated to prepare hydrogen, some hydrogen or/and residual gas prepared by the hydrogen preparation equipment are combusted to maintain the operation of the hydrogen preparation equipment.

* * * * *